United States Patent [19]

Bosne

[11] Patent Number: 4,666,593
[45] Date of Patent: May 19, 1987

[54] PACKING DEVICE FOR AN INSTALLATION FOR THE BIOLOGICAL TREATMENT OF WASTE WATERS

[75] Inventor: Georges J. P. E. Bosne, Viroflay, France

[73] Assignee: Hamon-Sobelco S.A., Brussels, Belgium

[21] Appl. No.: 887,243

[22] Filed: Jul. 16, 1986

[30] Foreign Application Priority Data

Aug. 5, 1985 [FR] France ............... 85 11956

[51] Int. Cl.$^4$ ............................................. C02F 3/10
[52] U.S. Cl. ................................. 210/150; 261/112; 261/DIG. 72; 428/183; 428/186; 428/188
[58] Field of Search ............... 261/112, DIG. 72; 210/150, 151, 493.1, 615; 428/186, 188, 183

[56] References Cited

U.S. PATENT DOCUMENTS

| | | | |
|---|---|---|---|
| 3,402,103 | 9/1968 | Amberg et al. | 261/112 |
| 3,887,664 | 6/1975 | Regehr | 261/112 |
| 4,096,214 | 6/1978 | Percevaut et al. | 261/112 |
| 4,344,899 | 8/1982 | Monjoie | 261/112 |
| 4,455,339 | 6/1984 | Meier | 261/112 |

FOREIGN PATENT DOCUMENTS

| | | | |
|---|---|---|---|
| 2355344 | 6/1974 | Fed. Rep. of Germany | 210/150 |
| 2263808 | 10/1975 | France | 210/150 |
| 2035284 | 6/1980 | United Kingdom | 210/150 |

*Primary Examiner*—Benoit Castel
*Attorney, Agent, or Firm*—Walter H. Schneider

[57] ABSTRACT

The invention relates to a packing device for an installation for the biological treatment of waste waters, of the type comprising an assembly of sheets (1) having corrugations and separated by flat sheets (2), said corrugated sheets (1) defining, in conjunction with the flat sheets (2), channels (7;8) which extend from top to bottom, and in which the waste water trickles countercurrently to an oxygen-containing gas. This device is characterized in that the crests of the corrugations have crenellations (9) which in conjunction with the adjacent flat sheet (2) bound passages establishing communication between two channels (7, 7 or 8, 8) lying on the same side of a corrugated sheet.

11 Claims, 1 Drawing Figure

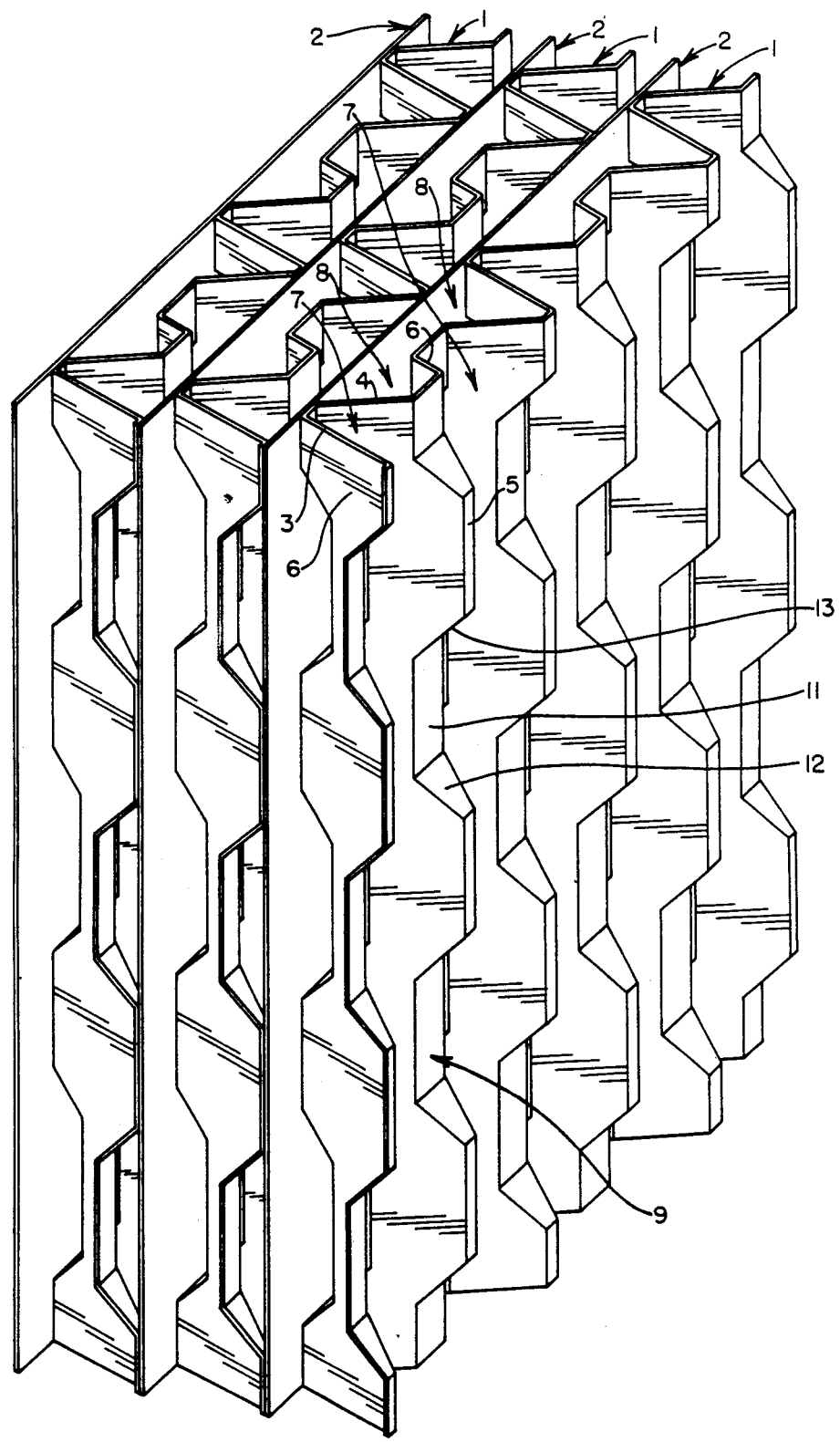

PACKING DEVICE FOR AN INSTALLATION FOR THE BIOLOGICAL TREATMENT OF WASTE WATERS

The present invention relates to a packing device, particularly for an installation for the biological treatment of waste waters.

BACKGROUND OF THE INVENTION

Aerobic biological treatment of waste waters consists in inducing the development of bacteria which, through a physicochemical action, retain and feed on the organic pollutants. For the biological treatment of urban and industrial effluents use is made in particular of packing devices forming static trickle surfaces over which the waters to be treated are distributed as well as possible.

The waters trickle over surfaces serving as supports for the purifying microorganisms. Aeration supplies the necessary oxygen. Degradation of the nutritive material consisting of the organic pollutants of the effluents occurs. This degradation corresponds chemically to a dehydrogenation, which is called aerobiosis or anaerobiosis depending on whether the hydrogen is fixed on the molecular oxygen superficially or on another acceptor in depth, when the biological film is sufficiently thick.

The mathematical relationship which takes into account the elimination of the BOD (biological oxygen demand) of waste water on a bacterial bed is written as follows:

$$\frac{Lf}{Lo} = e^{-KtSsmHQ-n}$$

where:
Lf=BOD of the clarified water.
Lo=BOD of the feed water.
Kt=coefficient depending on the temperature and nature of the material.
Ss=specific surface of the material ($m^2/m^3$).
H=trickling height.
Q=specific flow rate.
n=constant.
m=exponent<1 determined by experiment.

Packing devices of plastics material for installations for the biological treatment of waste waters already exist, but they have various disadvantages:

Some are composed of multichannel tubular sections and have to be transported to the site in the form in which they will be installed, thus constituting a considerable volume in relation to the active surface. Transport is therefore a very important factor in the cost price, which thus becomes prohibitive for long distances, particularly for export.

The small section of these multichannel sections makes it necessary for them to be grouped together in open-work holders which, since they have to stay in place during use, must be made of a metal resistant to the corrosive media found in effluents and are therefore expensive.

Other devices are composed of elements of slight height, which are stacked one on the other. These elements are in particular in the form of assemblies of corrugated sheets separated by flat sheets defining channels between them. However, the channels of one element do not in most cases face the channels of the elements above and below them. There is consequently a considerable risk of clogging, which can be cleared only by very onerous dismantling and re-assembly.

In certain devices the channels situated facing beams or support members are necessarily obstructed. The entire surface of these channels then becomes inactive from top to bottom.

SUMMARY OF THE INVENTION

The present invention seeks to provide a packing device which is exempt from the disadvantages of the prior art.

To this end, the present invention relates to a packing device, particularly for an installation for the biological treatment of waste waters, of the type comprising an assembly of sheets having corrugations and separated by flat sheets, these corrugated sheets defining, in conjunction with the flat sheets, channels which extend from top to bottom and in which the waste water trickles countercurrently to an oxygen-containing gas, this device being characterized in that the crests of the corrugations have crenellations which in conjunction with the adjacent flat sheet bound passages establishing communication between channels lying on the same side of a corrugated sheet.

A device of this kind makes it possible for the waste water to pass from one channel to another. Consequently, if one of the channels should become clogged in its lower part, it will nevertheless remain effective over practically its entire length, because the gas and the waste water can circulate in it by passing over to one or more adjacent channels in the obstructed zone. However, in order to reduce the inactive surface in the event of the clogging of one or more channels, the crenellations provided in the crests of two adjacent corrugations may be offset, in the vertical direction of the corrugations, in relation to one another. In a preferred variant the offsetting is such that the crenellations form a staggered pattern.

In addition, the channels are advantageously rectilinear in order to permit easy clearing. With the packing according to the present invention there is little danger of this becoming necessary, because if a channel is clogged only a small part of the packing will be out of action, so that intervention will not be called for.

The corrugated sheets may have corrugations of various shapes. Nevertheless, corrugations having a trapezoidal profile are preferred.

Similarly, the profile of the crenellations is preferably trapezoidal.

The device according to the invention may rest in known manner on horizontal supports provided with cross pieces. In order further to reduce to the minimum the risk of clogging, the flat separating sheets may be omitted in the bottom part of the device, for example over a length of a few centimeters.

The sheets constituting the device according to the present invention may in particular be sheets of rigid plastics material, for example polyvinyl chloride. The sheets provided with corrugations may be produced by thermoforming flat sheets.

For the purpose of producing the device, the sheets may be assembled by welding or adhesive bonding.

All the corrugated or flat sheets used may also have additional corrugations or embossing of slight dimensions in order to increase the surfaces in contact with the waste waters, and/or perforations in order to improve liquid-gas exchange.

The invention is explained below in greater detail with the aid of a drawing showing only one embodiment.

BRIEF DESCRIPTION OF THE DRAWING

In this drawing the single FIGURE is a perspective view of a part of a device according to the invention.

DESCRIPTION OF THE PREFERRED EMBODIMENTS

The device shown in the single FIGURE comprises an assembly of sheets 1 which are provided with corrugations and which are separated by flat sheets 2 Each sheet made of plastics material may for example have a width of 1 meter and a length of several meters. These sheets are assembled, for example by adhesive bonding, to form elements having a thickness of, for example, 1 meter.

The sheets 1 provided with corrugations have a general profile of trapezoidal shape in a plane at right angles to the crest of these corrugations.

Each corrugation comprises a first flat side 3, an inclined flat side 4 forming an obtuse angle to the side 3, a flat side 5 parallel to the first flat side 3, and an inclined flat side 6 forming an obtuse angle to the flat side 5.

In conjunction with the adjacent flat sheets 2 to which the sheet 1 is joined, this corrugation of the sheet 1 defines two channels 7 and 8, which are rectilinear.

The crests of each corrugation have crenellations 9 of trapezoidal shape.

Each crenellation 9 comprises a flat side 11 parallel to the flat sides 3 or 5 and bordered by two inclined flat sides 12 and 13 forming an obtuse angle to the flat side 11. These crenellations extend over the entire length of each crest. Each crenellation 9 brings into communication two channels such as 7 or two channels such as 8, that is to say two channels lying on the same side of the sheet 1.

The crenellations 9 are disposed in such a manner on the crests of two adjacent corrugations that they are offset relative to one another in the vertical direction of the corrugations and form a staggered pattern.

The packing device is disposed in the purification vessel on a mesh support in such a manner as to be vertical, that is to say in such a manner that the channels 7 and 8 are vertical.

The water to be treated is dispersed at the top of the packing device and flows vertically over the sheets forming the channels" On these sheets the waste material is brought into contact on the one hand with the purifying microorganisms, and on the other hand with the air circulating from bottom to top.

As can easily be realized, a device of this kind makes it possible to reduce to the minimum the risk of clogging. Furthermore, it offers the following additional advantages:

The height of the packing device can be adapted to the installation. Problems connected with the stacking of elements on one another are thus avoided. Furthermore, if an obstruction should occur, the actual constitution of the channels would permit easy cleaning.

The device can be produced in situ The cost of transport is thus considerably reduced in comparison with devices assembled at the factory and constituting very large volumes to be transported The thickness of the device can be adjusted to suit the installation. It is therefore not necessary to join together a plurality of elements, for example by hooping.

The height of the device can be adjusted to suit the installation. All that is required is to cut the sheets to the desired dimensions.

What is claimed is:

1. Packing device for an installation for the biological treatment of waste waters, of the type comprising an assembly of sheets (1) having corrugations and separated by flat sheets (2), said corrugated sheets (1) defining, in conjunction with the flat sheets (2), channels (7; 8) which extend from top to bottom and in which the waste water trickles countercurrently to an oxygen-containing gas, in which device crests of the corrugations have crenellations (9) which in conjunction with the adjacent flat sheet (2) bound passages establishing communication between two channels (7, 7 or 8, 8) lying on the same side of a corrugated sheet (1).

2. Device as claimed in claim 1, wherein the crenellations (9) on the crests of two adjacent corrugations are offset, in the vertical direction of the corrugations, in relation to one another.

3. Device as claimed in claim 2, wherein the offsetting is such that the crenellations form a staggered pattern.

4. Device as claimed in claim 1, wherein the channels (7, 8) are rectilinear.

5. Device as claimed in claim 1, wherein the profile of the corrugations is trapezoidal.

6. Device as claimed in claim 5, wherein the profile of the crenellations (9) is trapezoidal.

7. Device as claimed in claim 1, wherein the flat separating sheets (2) are omitted in the bottom part of the device.

8. Device as claimed in claim 1, wherein the sheets (1, 2) are of thermoplastic material.

9. Device as claimed in claim 1, wherein the sheets (1, 2) are welded.

10. Device as claimed in claim 1, wherein the sheets (1, 2) are adhesive bonded.

11. Device as claimed in claim 1, wherein the corrugated sheets (1) and flat sheets (2) are provided with additional corrugations or embossing of slight dimensions.

* * * * *